United States Patent
Vincent

(10) Patent No.: US 11,144,658 B2
(45) Date of Patent: Oct. 12, 2021

(54) DATA PROCESSING SYSTEM DEFENSE

(71) Applicant: Arm Limited, Cambridge (GB)

(72) Inventor: Hugo John Martin Vincent, Cambridge (GB)

(73) Assignee: Arm Limited, Cambridge (GB)

( * ) Notice: Subject to any disclaimer, the term of this patent is extended or adjusted under 35 U.S.C. 154(b) by 201 days.

(21) Appl. No.: 16/441,478

(22) Filed: Jun. 14, 2019

(65) Prior Publication Data

US 2020/0394319 A1     Dec. 17, 2020

(51) Int. Cl.
| | |
|---|---|
| *G06F 21/00* | (2013.01) |
| *G06F 21/62* | (2013.01) |
| *G06F 17/18* | (2006.01) |
| *G06F 21/55* | (2013.01) |

(52) U.S. Cl.
CPC .......... *G06F 21/6209* (2013.01); *G06F 17/18* (2013.01); *G06F 21/554* (2013.01); *G06F 21/629* (2013.01)

(58) Field of Classification Search
CPC ........ G06F 21/50; G06F 21/55; G06F 21/554; G06F 21/556; G06F 21/70; G06F 21/71; G06F 21/72; G06F 21/75; G06F 21/755; G06F 21/6209; G06F 21/629; G06F 17/18

See application file for complete search history.

(56) References Cited

U.S. PATENT DOCUMENTS

2019/0042738 A1*   2/2019   Juliato .................. G06F 21/554

OTHER PUBLICATIONS

Kneib et al., "Scission: Signal Characteristic-Based Sender Identification and Intrusion Detection in Automotive Networks", CCS' 18, Oct. 15-19, 2018, 14 pages.
Murvay et al., "Source Identification Using Signal Characteristics in Controller Area Networks", IEEE Signal Processing Letters, vol. 21, No. 4, Apr. 2014, pp. 395-399.

\* cited by examiner

*Primary Examiner* — Edward Zee
(74) *Attorney, Agent, or Firm* — Nixon & Vanderhye P.C.

(57) ABSTRACT

A data processing system and method of operating such a data processing system are disclosed. The data processing system comprises an interface for communication between a first module and a second module and compensation parameter storage to store at least one stored compensation parameter for application in operation of the interface and representing an expected physical state of the interface. Measurement circuitry measures a current physical state of the interface and generates at least one measured compensation parameter which is dependent on that current physical state. Monitoring circuitry receives the at least one measured compensation parameter and compares it against at least one stored compensation parameter representing the expected physical state of the interface and may initiate a defensive response in the system when the at least one measured compensation parameter differs by more than a threshold difference from the at least one stored compensation parameter. The security of the data processing system is thereby improved.

12 Claims, 5 Drawing Sheets

DATA PROCESSING SYSTEM DEFENSE

TECHNICAL FIELD

The present disclosure relates to data processing systems. In particular, the present disclosure relates to defensive techniques in data processing systems.

DESCRIPTION

It may be required for sensitive data to be transmitted around a data processing system and therefore for such a data processing system to be a potential target for an attack which seeks to determine what that sensitive data is. One approach to this issue is to encrypt the sensitive data which is transmitted around the system, but such encryption may come at the price of reduced performance, increased power consumption, greater thermal expenditure, and so on, and therefore such encryption may not be desirable. Nevertheless the need remains for a data processing system to be able to defend itself against attacks which seek to access sensitive data which is transmitted around the system and should not be accessible to unauthorised outside parties.

SUMMARY

In one example embodiment described herein there is a data processing system comprising: an interface for communication between a first module and a second module; compensation parameter storage for at least one stored compensation parameter for application in operation of the interface and representing an expected physical state of the interface; measurement circuitry capable of measuring a current physical state of the interface and of generating at least one measured compensation parameter, wherein the at least one measured compensation parameter is dependent on the current physical state of the interface; and monitoring circuitry capable of comparing the at least one measured compensation parameter with the at least one stored compensation parameter and of initiating a defensive response by the data processing system when the at least one measured compensation parameter differs by more than a threshold difference from the at least one stored compensation parameter.

In one example embodiment described herein there is a method of operating a data processing system comprising: storing at least one stored compensation parameter for application in operation of an interface, wherein the at least one stored compensation parameter represents an expected physical state of the interface; operating the interface for communication between a first module and a second module of the data processing system; measuring a current physical state of the interface; generating at least one measured compensation parameter in dependence on the current physical state of the interface; comparing the at least one measured compensation parameter with the at least one stored compensation parameter; and initiating a defensive response by the data processing system when the at least one measured compensation parameter differs by more than a threshold difference from the at least one stored compensation parameter.

In one example embodiment described herein there is a data processing system comprising: means for storing at least one stored compensation parameter for application in operation of an interface, wherein the at least one stored compensation parameter represents an expected physical state of the interface; means for operating the interface for communication between a first module and a second module of the data processing system; means for measuring a current physical state of the interface; means for generating at least one measured compensation parameter in dependence on the current physical state of the interface; means for comparing the at least one measured compensation parameter with the at least one stored compensation parameter; and means for initiating a defensive response by the data processing system when the at least one measured compensation parameter differs by more than a threshold difference from the at least one stored compensation parameter.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
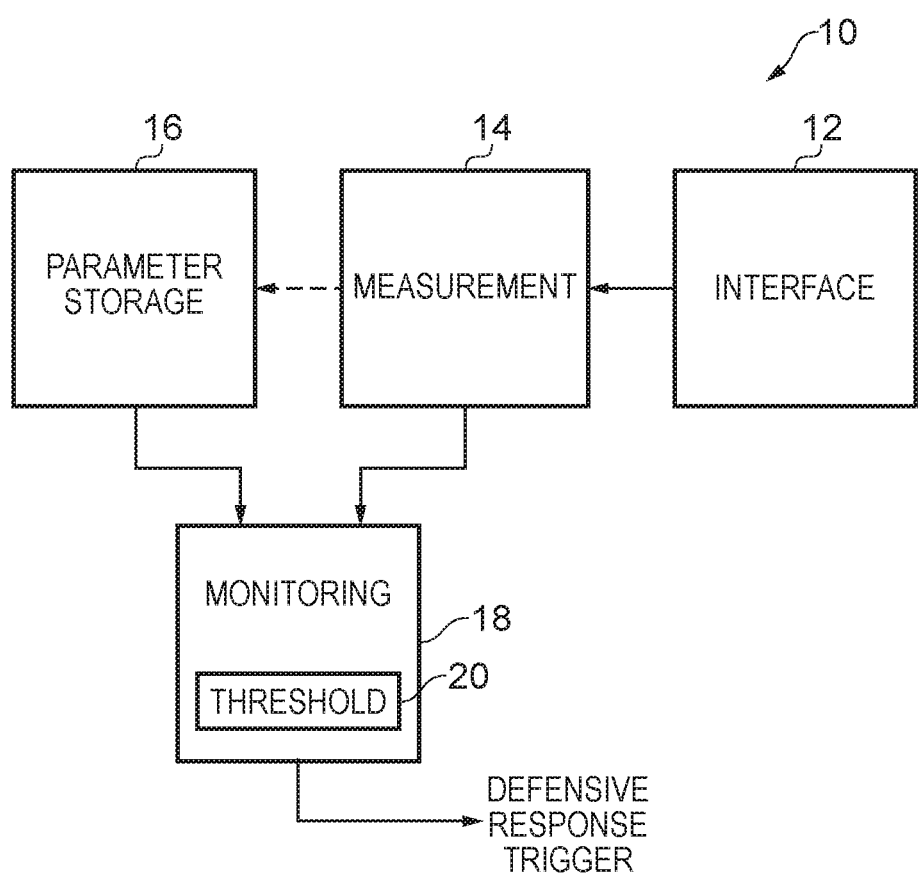
FIG. 1 schematically illustrates a data processing system in one example embodiment.

Before discussing the embodiments with reference to the accompanying figures, the following description of embodiments is provided.

In accordance with one example configuration there is provided a data processing system comprising: an interface for communication between a first module and a second module; compensation parameter storage for at least one stored compensation parameter for application in operation of the interface and representing an expected physical state of the interface; measurement circuitry capable of measuring a current physical state of the interface and of generating at least one measured compensation parameter, wherein the at least one measured compensation parameter is dependent on the current physical state of the interface; and monitoring circuitry capable of comparing the at least one measured compensation parameter with the at least one stored compensation parameter and of initiating a defensive response by the data processing system when the at least one measured compensation parameter differs by more than a threshold difference from the at least one stored compensation parameter.

In order to protect the data processing system from external attack or interference, the present techniques propose an approach in which an interface of the data processing system is monitored by the data processing system itself. In particular, the data processing system is provided with measurement circuitry in order to enable it to measure a current physical state of the interface and to generate a measured compensation parameter which depends on the current physical state of the interface. The measured compensation parameter may take a variety of forms, but in particular, in dependence on the nature that such external attack or interference could be expected to take, the measured compensation parameter may be selected to be sensitive to changes which can reflect the fact that such external attack or interference is taking place. The data processing system further comprises compensation parameter storage which stores at least one stored compensation parameter representing an expected physical state of the interface. In other words, the expected physical state of the interface is that physical state which the interface is expected to have under normal operating conditions, that is, when the data processing system is not subject to external attack or interference.

By comparison of the measured compensation parameter with the at least one stored compensation parameter, the data processing system can then determine whether the two differ from one another by more than a threshold difference, and in the event that they do can initiate a defensive response. Thus it will be understood that the threshold difference may be set in advance to be (depending on the level of sensitivity which is desired that the data processing system has to such potential security compromises) at a level which has been determined to be appropriate for initiating the defensive response. Indeed, where the defensive response may itself disrupt normal operating procedures for the data processing system, the threshold difference may be set bearing that factor in mind as well.

The measuring of the current physical state of the interface may be performed in a variety of ways, but in some embodiments comprises measuring a characteristic of the operation of the interface as a proxy measurement of the current physical state of the interface. Where various characteristics of the operation of the interface (e.g., broadly put, better or worse performance according to various possible metrics) can be expected to depend the current physical state of the interface, the present techniques recognise that such a characteristic may be used as a proxy measurement of the current physical state of the interface (i.e. without ever directly measuring that current physical state of the interface).

The interface which is monitored by the measuring circuitry and the monitoring circuitry itself may take a variety of forms. The interface may allow the data processing system to communicate internally (i.e. both modules form part of the data processing system itself) or with other systems, storage devices, communication devices, and so on (i.e. only one module might form part of the data processing system itself whilst the other is a communication target outside the system itself). The interface may for example be a high speed interface such as DDRx and PCIe and used for example to communicate data around the data processing system or could allow communication with a component external to the data processing system. Due to performance requirements and power or thermal constraints, encryption and authentication may not be used on such high speed interfaces, to allow them to transmit the data as fast as possible, yet this may leave them potentially vulnerable to physically invasive security attacks such as probing or man-in-the-middle. Applying the present techniques to such an interface can allow the effects of such security attacks to be noticed when they have an effect on the current physical state of the interface and hence the at least one measured compensation parameter.

The at least one stored compensation parameter may take a variety of forms as applicable to the nature of the interface which is being monitored, but in some embodiments the at least one stored compensation parameter comprises at least one trained equalisation parameter for the interface. For example when the interface is one of the above mentioned high speed interfaces these typically require equalisation or matching, i.e. a circuit-level analogue technique to modify the complex impedance of the signal lines and/or to pre-distort the signal in such a way to cancel out any distortion introduced by the signal lines. Such distortion characteristics of the signal lines can be very sensitive to small changes such as printed circuit board (PCB) routing, precise lengths of the traces on the PCB, and humidity from the air being absorbed into the PCB dielectric. Accordingly, at least one trained equalisation parameter for such an interface can present a sensitive monitor which allows even small changes to these physical characteristics to be noticed.

Due to the sensitivity of such high speed signal lines to the above mentioned factors, dynamic training or equalisation strategies may be employed to precisely adapt the signalling to the transmission line behaviour on an on-going basis during operation of the system. As such interfaces push towards even higher speeds, such dynamic training is becoming more widespread and indeed necessary. Accordingly, in some embodiments the apparatus further comprises dynamic equalisation circuitry to monitor and update the at least one trained equalisation parameter for the interface at intervals during operation of the interface.

The at least one stored compensation parameter may take a variety of forms and in some embodiments the interface is capable of operating in plural states and the at least one stored compensation parameter comprises an indication of an expected operating state of the interface. These plural states could take a variety of forms depending on the particular interface, but may for example be a normal data transmission operating state, a recovery state, a set-up state used at boot, and so on. In this context, the at least one stored compensation parameter may be an indication of the operating state of the interface which is expected, e.g. the normal data transmission operating state, and a deviation from this, e.g. into a recovery state, may be an indication that the interface has reacted to a change in conditions (possibly as a result of a invasive attack) and this therefore may be expected to cause a measured compensation parameter difference which the data processing system can use to initiate the defensive response.

The interface may take a variety of forms but in some embodiments the interface is a memory interface and the characteristic of the operation of the interface comprises an expected error rate reported at the memory interface. Where the expected error rate is sensitive to the conditions under which such a memory interface is operating, it may be expected that the error rate would increase when physically invasive probing or tampering or another kind of security compromise is taking place and therefore an expected error rate for the memory interface may present a useful characteristic of the operation of the interface to be used as the basis to determine if a defensive response is appropriate.

Similarly, in some embodiments the characteristic of the operation of the interface comprises an expected bitrate carried by the interface. The bitrate carried by the interface may also be sensitive to the conditions under which the interface is operating and similarly external interference may cause this bitrate to drop and therefore an expected bitrate also represents a useful characteristic of the operation of the interface to be used as the basis to determine if it is suspected that external interference is underway and a defensive response is appropriate.

As described so far the stored compensation parameter may represent only a single snapshot of what the measured compensation parameter is expected to be under normal operating conditions, but the present techniques further propose that a sequence of such values could also be stored representative of an expected time-evolution of the physical state of the component being measured. In other words, the present techniques are not only relevant to monitoring a static physical state of the interface but recognise that under certain circumstances the physical state may legitimately be expected to change over time, but within expected limits. Accordingly in some embodiments the compensation parameter storage is capable of storing plural values of the at least one stored compensation parameter, wherein the plural values of the at least one stored compensation parameter represent a sequence of measurements of the physical state of the interface by the measurement circuitry, and wherein the monitoring circuitry is capable of comparing the at least one measured compensation parameter with the plural values of the at least one stored compensation parameter and of determining when the at least one measured compensation parameter differs from an expected time-evolution of the physical state of the interface by more than the threshold difference. This allows the expected time-evolution of the physical state of the interface to be taken into account and allowed for. Conversely, it should also be recognised that where it is expected that the physical state of the interface does evolve over time, in this context a static physical state which does not evolve could itself be an indication of unexpected behaviour worthy of a defensive response.

It is recognised here that although the physical state of the interface may be monitored and measured carefully, some normal variation in the physical state of the interface is to be expected and may need to be allowed for. Accordingly in some embodiments the compensation parameter storage is capable of storing plural values of the at least one stored compensation parameter, wherein the plural values of the at least one stored compensation parameter represent plural measurements of the physical state of the interface by the measurement circuitry, and wherein the monitoring circuitry is capable of comparing the at least one measured compensation parameter with the plural values of the at least one stored compensation parameter and of determining when the at least one measured compensation parameter differs from an expected statistical variation in the physical state of the interface by more than the threshold difference. Thus, the stored plural values of the at least one stored compensation parameter allow a determination to be made of what an expected statistical variation in the physical state of the interface is and in this context the defensive response may only be triggered when the at least one measured compensation parameter differs from an expected statistical variation of the plural values of the at least one stored compensation parameter. The threshold difference between the expected statistical variation and the measured compensation parameter can be set to allow for different tolerance levels, such as variation within one sigma, two sigma, three sigma, etc. as appropriate.

In some embodiments variation in the at least one measured parameter may be allowed for in other ways. For example in some embodiments the monitoring circuitry is capable of comparing the at least one measured compensation parameter with a Kalman filter generated expectation for the physical state of the interface and of determining when the at least one measured compensation parameter differs from the Kalman filter generated expectation by more than the threshold difference. This presents another useful mechanism by which natural variation in the expectation of the measured compensation parameter can be determined and allowed for, whilst variations outside this expectation can trigger the defensive response.

The monitoring circuitry may be provided in various configurations within the data processing system, but in some embodiments the data processing system further comprises: a processor capable of interacting with the interface; and a further secure processor configured to perform secure processing tasks, wherein the monitoring circuitry is comprised within the further secure processor. This provides a further defensive technique for protecting the operation of this security related feature.

In accordance with one example configuration there is provided a method of operating a data processing system comprising: storing at least one stored compensation parameter for application in operation of an interface, wherein the at least one stored compensation parameter represents an expected physical state of the interface; operating the interface for communication between a first module and a second module of the data processing system; measuring a current physical state of the interface; generating at least one measured compensation parameter in dependence on the current physical state of the interface; comparing the at least one measured compensation parameter with the at least one stored compensation parameter; and initiating a defensive response by the data processing system when the at least one measured compensation parameter differs by more than a threshold difference from the at least one stored compensation parameter.

In accordance with one example configuration there is provided a data processing system comprising: means for storing at least one stored compensation parameter for application in operation of an interface, wherein the at least one stored compensation parameter represents an expected physical state of the interface; means for operating the interface for communication between a first module and a second module of the data processing system; means for measuring a current physical state of the interface; means for generating at least one measured compensation parameter in dependence on the current physical state of the interface; means for comparing the at least one measured compensation parameter with the at least one stored compensation parameter; and means for initiating a defensive response by the data processing system when the at least one measured compensation parameter differs by more than a threshold difference from the at least one stored compensation parameter.

Particular embodiments will now be described with reference to the figures.

FIG. 1 schematically illustrates a data processing system 10 in one example embodiment. An interface 12 of the data processing system which is being monitored is illustrated together with measurement circuitry 14, parameter storage 16, and monitoring circuitry 18. The measurement circuitry is arranged to measure a current physical state of the interface and to generate at least one measured parameter representing that current physical state. In an initial set up phase the measurement circuitry 14 may cause this at least one measured parameter to be stored as at least one stored parameter in the parameter storage 16 for comparison against future measurements. In on-going usage the measured current physical state of the interface is turned into the at least one measured parameter by the measurement circuitry 14 and this is passed to the monitoring circuitry 18, which also retrieves the at least one stored parameter from the parameter storage 16. The monitoring circuitry 18 compares the at least one measured parameter with the at least one stored parameter and if these differ by less than a pre-determined threshold difference 20 then the monitoring circuitry takes no further action, waiting until the next measurement of the physical state of the interface is carried out. However if the at least one measured parameter differs from the at least one stored parameter by more than the threshold 20, the monitoring circuitry generates a defensive response trigger. This defensive response trigger may be received by one or more components of the data processing system as appropriate to the defensive response which has been pre-determined to be appropriate in such a situation.

Figure 2:
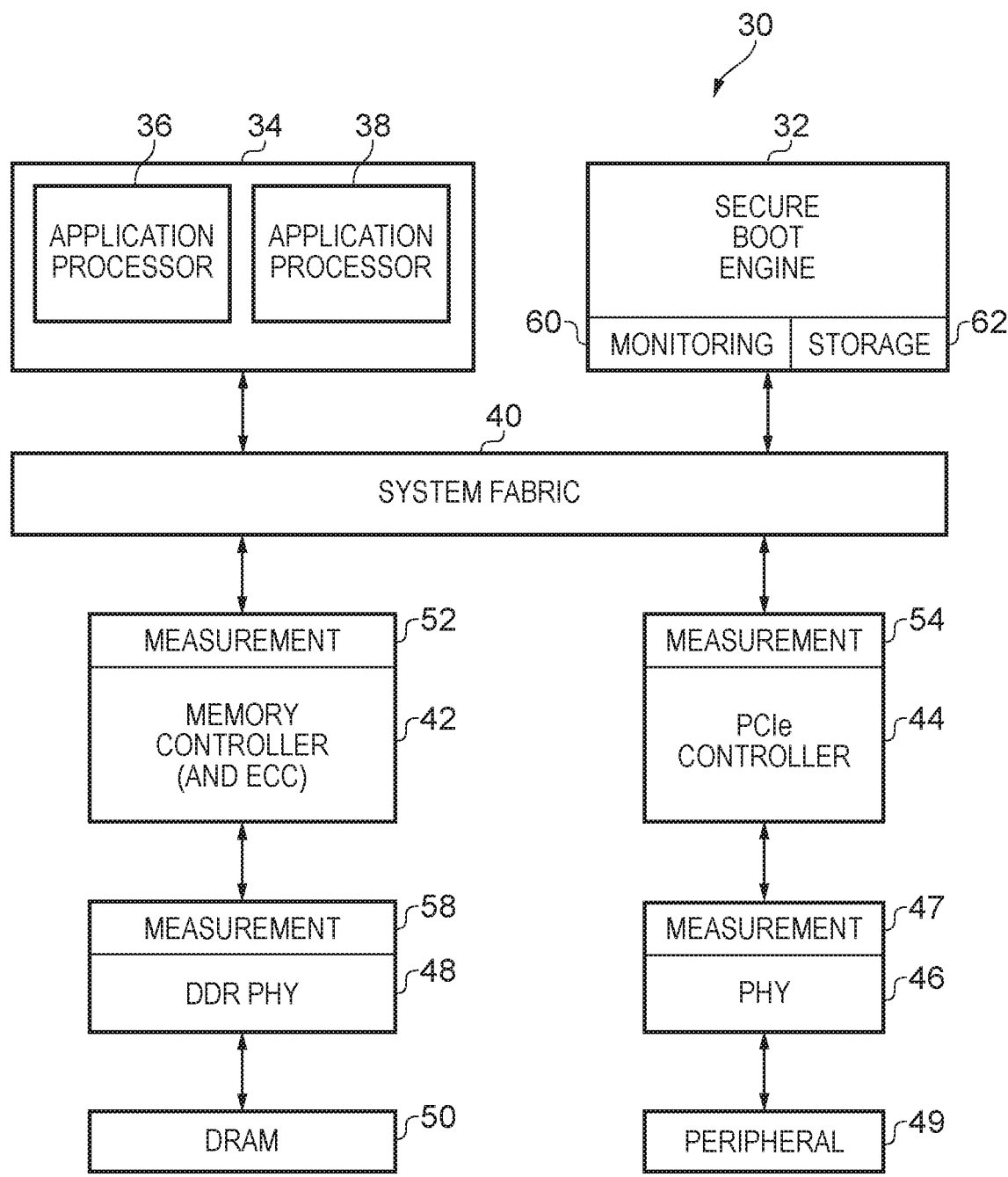
FIG. 2 schematically illustrates a data processing system in one example embodiment.

FIG. 2 schematically illustrates a data processing system 30 in an example embodiment. The data processing system 30 comprises a secure boot engine 32 and a processor 34, which in fact as illustrated itself comprises two application processors 36, 38. The secure boot engine 32 and the processor 34 are connected to the remainder of the system via the system fabric 40. Further illustrated components of the data processing system are the memory controller and error-correcting code (ECC) component 42, providing access via the DDR PHY 48 to the DRAM 50. There is also a PCIe controller 44 for access via the PHY 46 to the peripheral component 46. In other example embodiments the memory controller may have parity monitoring functionality as well as, or instead of, the ECC functionality. The secure boot engine 32 is a dedicated hardware device to control the start up (boot) of the data processing system and in the context of the present techniques that secure boot process may comprise causing measurement circuitry associated with an interface in the system to measure a current physical state of the interface and generate at least one measured parameter representing that current physical state to store as the expected state of the interface. In the example embodiment shown in FIG. 2 the memory controller comprises an associated measurement circuit 52, the PCIe controller 44 comprises an associated measurement circuit 54, the DDR PHY 48 comprises an associated measurement circuit 58, and the PHY 47 comprises and associated measurement circuitry 47. For clarity of illustration these are shown as closely associated with (positioned adjacent to) their respective interface, but in other example embodiments they may form a stand-alone components. Also, in the example embodiment of FIG. 2 the secure boot engine 32 further comprises monitoring circuitry 60 and storage 62. The storage 62 serves to store at least one stored parameter representing an expected state of at least one of the interfaces of the data processing system 30, whilst the monitoring circuitry 60 is provided to compare measured parameters with the corresponding stored parameter. The monitoring 60 and the storage 62 are provided in this example embodiment as part of the secure boot engine 32 to provide them with an additional level of security against interference by attackers seeking to compromise the security of the data processing system. Accordingly, the illustrated example embodiment in FIG. 2 is arranged to monitor the current physical state of at least part of the memory controller (and perhaps ECC and/or parity component) 42, where the expected physical state may for example comprise an expected operating state of the memory controller and/or ECC/parity component, an expected error rate reported from the memory controller and/or ECC/parity component, an expected bit rate carried by this memory interface, and any other measurable physical characteristic of these components. Similarly the measurement circuitry 54 is arranged to measure a characteristic of the current physical state of (or operating characteristic of) the PCIe controller 44.

The data processing system of the example embodiment shown in FIG. 2 is arranged to perform monitoring of the PHY interface 46 controlled by the PCIe controller 44 and the measurement circuitry 47 in this example represents circuitry arranged to perform the required equalisation or matching for the signal lines of the PCIe PHY interface, where it is recognised that this high speed interface comprises the capability to perform equalisation or matching on the PCIe controller to modify the complex impedance of its component signal lines and/or pre-distort the signal to cancel out distortion introduced by its signal lines. Values representing those equalisation or matching parameters created to cancel out this distortion then represent measured compensation parameters which may be compared against expected equalisation or matching parameters stored in the storage 62 and when deviation therefrom exceeds a predetermined threshold difference held by the monitoring circuitry 60, a defensive response is triggered. In a similar manner the data processing system of the example embodiment shown in FIG. 2 is arranged to perform similar monitoring of the DDR PHY 48 and the measurement circuitry 58 in this example represents circuitry arranged to perform the required equalisation or matching for the signal lines of the DDR PHY, and these measured equalisation or matching parameters can then be reported firstly as expected parameters for storage in the storage 62 and later during normal operation can be reported as a representation of the current physical state of the DDR PHY interface and compared against expected parameters representing the expected physical state of the DDR PHY interface. When the two types differ by more than a pre-determined threshold the defensive response can be triggered.

Figure 3:
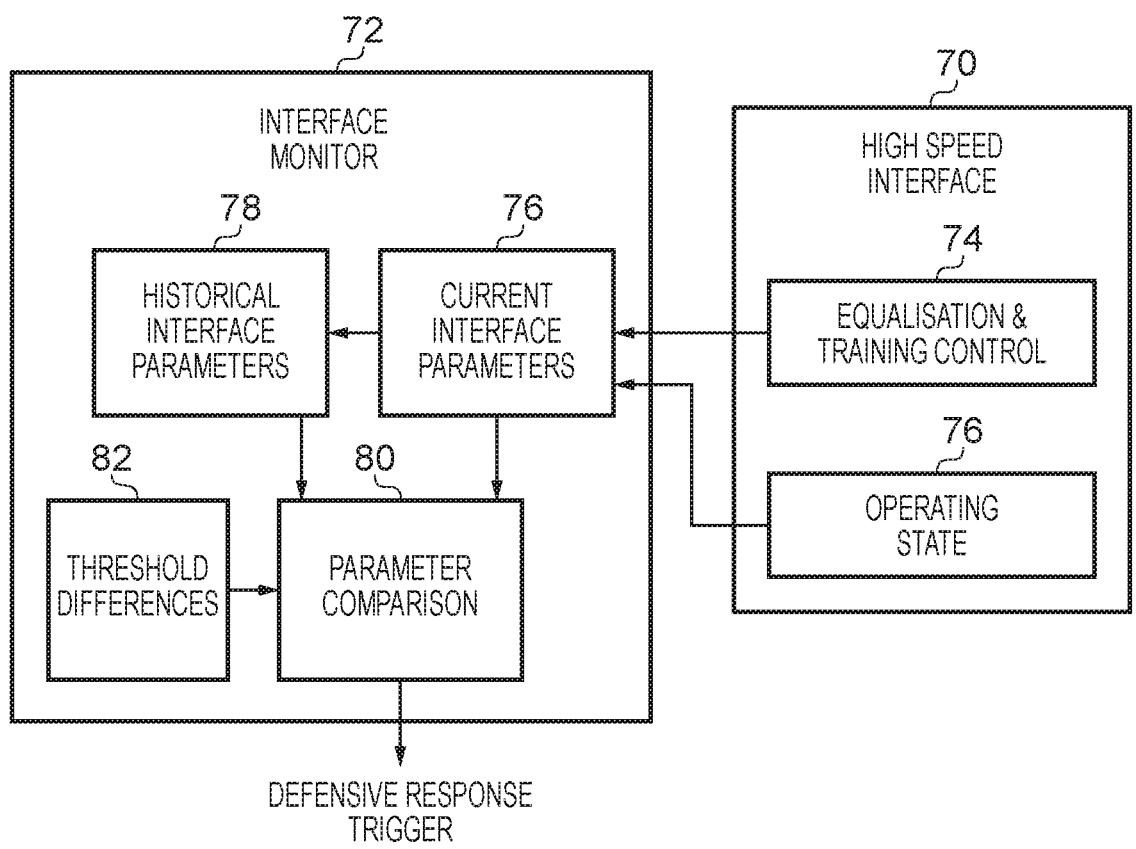
FIG. 3 schematically illustrates an interface monitor provided to monitor a high speed interface in one embodiment.

FIG. 3 schematically illustrates in more detail the monitoring of a high speed interface 70, which may for example be a DDR or PCIe interface such as discussed above with reference to FIG. 2. An interface monitor 72 is also provided. The high speed interface 70 comprises equalisation and training control circuitry 74 which is arranged to perform an initial equalisation and training of the high speed interface to modify the complex impedance of its signal lines and/or pre-distort the signal transmitted so as to compensate for any measured distortion introduced by the signal lines. These equalisation/matching parameters are reported as current interface parameters 76 in the interface monitor 72. The high speed interface 70 is arranged to function in several operating states and a current operating state 76 of the high speed interface may also be reported to the interface monitor 72 representing another current interface parameter 76. In an initial set-up phase the current interface parameter(s) 76 can be passed to the historical interface parameters circuitry 78 of the interface monitor 72, which comprises storage for these parameters to represent an expected physical state of the high speed interface 70. They may also represent a set of parameters representing either a range of expected values for a parameter representing the current physical state of the high speed interface or an expected time-evolution of the physical state of the high speed interface. Then in normal on-going operation of the high speed interface in the data processing system the current interface parameters being regularly reported from the high speed interface 70 are compared against appropriate stored interface parameters retrieved from unit 78 by parameter comparison circuitry 80. Parameter comparison circuitry 80 has reference to one or more predefined threshold differences 82, and when at least one current interface parameter differs by more than its defined threshold difference from an expected (stored) interface parameter the parameter comparison circuitry 80 triggers a defensive response. Where the high speed interface 70 is configured to operate at high data rates, the equalisation and training control circuitry 74 is arranged to perform dynamic training and equalisation, i.e. where, after an initial set up phase to determine equalisation/matching parameters for the interface, this process is repeated on an on-going basis during the operation of the high speed interface. Accordingly, when current measured interface parameters are reported to the interface monitor 72 if these are within the threshold difference defined, they may be accepted as updated expected interface parameters for the high speed interface and the stored parameters may be updated to reflect this. Accordingly, for example the interface monitor 72 may therefore be arranged to allow a slow progression of change of the measured interface parameters, so long as these occur within predefined limits (threshold), but when these vary too sharply, i.e. exceed those defined thresholds then the defensive response trigger may be initiated. Further, the parameter comparison circuitry 80 can be arranged to determine a Kalman filter generated expectation for one or more measured parameters on the basis of previously observed measured parameters. Deviation from this expectation or these expectations may also trigger a defensive response.

Figure 4:
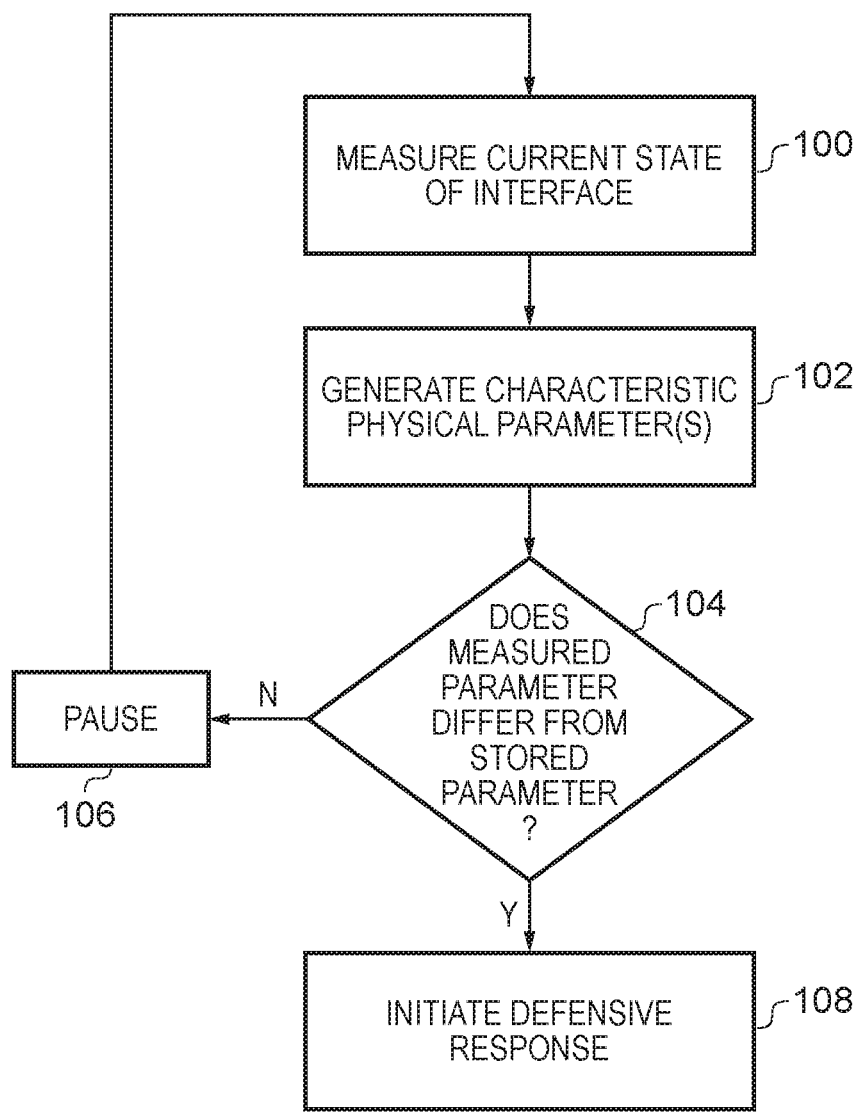
FIG. 4 is a flow diagram schematically illustrating a sequence of steps which are taken in one method embodiment.

FIG. 4 shows a sequence of steps which are taken in an example embodiment of operating a data processing system such as one of those described in the example embodiments of FIGS. 1-3 above. The flow can be considered to begin at step 100 where a current state of a interface of the system is measured. On this basis at step 102 a characteristic physical parameter or parameters representative of this current state is/are generated and then at step 104 it is determined if a measured parameter differs (i.e. by more than a predetermined threshold) from a corresponding stored parameter. If it does not then the flow proceeds to step 106 and then, after a suitable pause, the flow returns to step 100 for the current state of the interface to be measured again. If however at step 104 it is determined that the threshold has been exceeded by the difference then the flow proceeds to step 108 where a defensive response is initiated.

Figure 5:
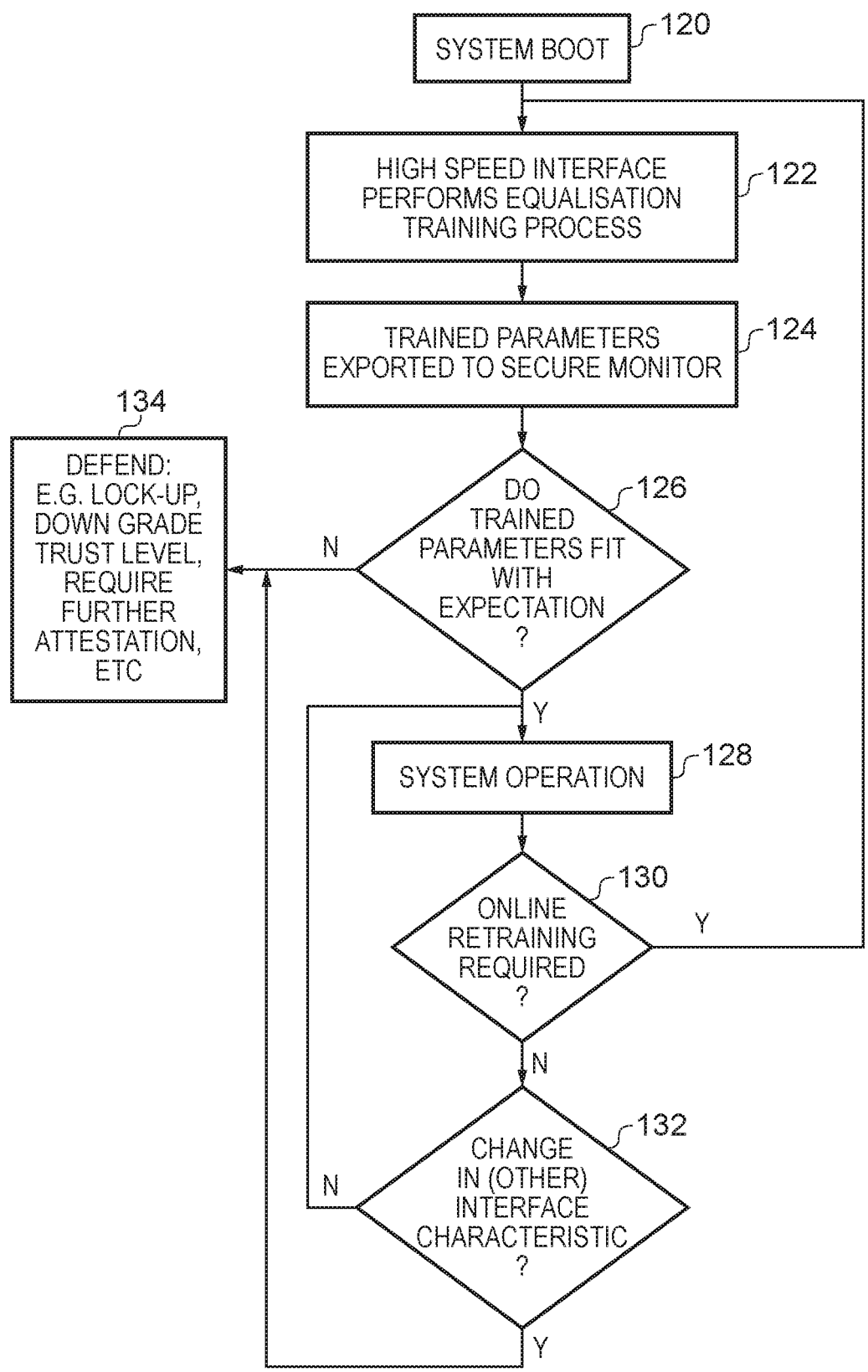
FIG. 5 is a flow diagram schematically illustrating a sequence of steps which are taken in one method embodiment.

FIG. 5 shows a flow diagram which represents a sequence of steps taken when operating a high speed interface according to the present techniques. The flow begins at step 120 where the system boots. Thereafter in an initial phase at step 122 the high speed interface performs its equalisation training process and at step 124 the trained parameters generated as a result of that equalisation training process are exported to a secure monitor in the data processing system for storage. Then at step 126 it is determined if the trained parameters fit with expectation. It is to be noted that even at this initial system boot stage the secure monitor may already be provided with predetermined limits for the trained parameters such that even an invasive security attack taking place at system boot may be noticed by the secure monitor. Accordingly, if, at step 126 it is found that the trained parameters do not fit with expectation then the flow proceeds to step 134 where a defensive response is initiated. This may for example comprise locking up the data processing system, downgrading a trust level currently defined for the system or for a particular component of the system, it may require further attestation to be carried out, and so on. If however at step 126 the trained parameters do fit within expected limits then normal system operation continues as represented by step 128. At the following step 130 it is determined if online (i.e. dynamic) retraining of the high speed interface is required, for example because a predetermined time interval for doing so has elapsed. This being the case then the flow returns to step 122 for the equalisation training process to be carried out. If however such online retraining is not required then the flow proceeds to step 132, where the secure monitor determines if there has been a change in any interface characteristic, for example such as its current operating state, or if any measured parameter differs by more than a threshold from its expectation. If this is not the case then the flow returns to step 128 of normal system operation. If however at step 132 such a change in an interface characteristic is detected, or the secure monitor determines that the current measured parameters representing the current physical state of the interface differ by more than the threshold difference from the trained parameters stored as the expected state of the interface, then the flow proceeds to step 134 where any one of the above described defensive measures may be taken.

In brief overall summary a data processing system and method of operating such a data processing system are disclosed. The data processing system comprises an interface for communication between a first module and a second module and compensation parameter storage to store at least one stored compensation parameter for application in operation of the interface and representing an expected physical state of the interface. Measurement circuitry measures a current physical state of the interface and generates at least one measured compensation parameter which is dependent on that current physical state. Monitoring circuitry receives the at least one measured compensation parameter and compares it against at least one stored compensation parameter representing the expected physical state of the interface and may initiate a defensive response in the system when the at least one measured compensation parameter differs by more than a threshold difference from the at least one stored compensation parameter. The security of the data processing system is thereby improved.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. A data processing system comprising:
   an interface for communication between a first module and a second module;
   compensation parameter storage for at least one stored compensation parameter for application in operation of the interface and representing an expected physical state of the interface;
   measurement circuitry configured to measure a current physical state of the interface and to generate at least one measured compensation parameter, wherein the at least one measured compensation parameter is dependent on the current physical state of the interface;

monitoring circuitry configured to compare the at least one measured compensation parameter with the at least one stored compensation parameter and to initiate a defensive response by the data processing system when the at least one measured compensation parameter differs by more than a threshold difference from the at least one stored compensation parameter, wherein the measurement circuitry is configured to measure a characteristic of the operation of the interface as a proxy measurement of the current physical state of the interface, and the at least one stored compensation parameter comprises at least one trained equalisation parameter for the interface; and dynamic equalisation circuitry to monitor and update the at least one trained equalisation parameter for the interface at intervals during operation of the interface.

2. The data processing system as claimed in claim 1, wherein the interface is configured to operate in plural states and the at least one stored compensation parameter comprises an indication of an expected operating state of the interface.

3. The data processing system as claimed in claim 1, wherein the compensation parameter storage is configured to store plural values of the at least one stored compensation parameter, wherein the plural values of the at least one stored compensation parameter represent a sequence of measurements of the physical state of the interface by the measurement circuitry, and wherein the monitoring circuitry is configured to compare the at least one measured compensation parameter with the plural values of the at least one stored compensation parameter and to determine when the at least one measured compensation parameter differs from an expected time-evolution of the physical state of the interface by more than the threshold difference.

4. The data processing system as claimed in claim 1, wherein the compensation parameter storage is configured to store plural values of the at least one stored compensation parameter, wherein the plural values of the at least one stored compensation parameter represent plural measurements of the physical state of the interface by the measurement circuitry, and wherein the monitoring circuitry is configured to compare the at least one measured compensation parameter with the plural values of the at least one stored compensation parameter and to determine when the at least one measured compensation parameter differs from an expected statistical variation in the physical state of the interface by more than the threshold difference.

5. The data processing system as claimed in claim 1, wherein the monitoring circuitry is configured to compare the at least one measured compensation parameter with a Kalman filter generated expectation for the physical state of the interface and to determine when the at least one measured compensation parameter differs from the Kalman filter generated expectation by more than the threshold difference.

6. The data processing system as claimed in claim 1, further comprising:
a processor configured to interact with the interface; and
a further secure processor configured to perform secure processing tasks, wherein the monitoring circuitry is comprised within the further secure processor.

7. A data processing system comprising:
an interface for communication between a first module and a second module; compensation parameter storage for at least one stored compensation parameter for application in operation of the interface and representing an expected physical state of the interface;

measurement circuitry configured to measure a current physical state of the interface and to generate at least one measured compensation parameter, wherein the at least one measured compensation parameter is dependent on the current physical state of the interface; and monitoring circuitry configured to compare the at least one measured compensation parameter with the at least one stored compensation parameter and to initiate a defensive response by the data processing system when the at least one measured compensation parameter differs by more than a threshold difference from the at least one stored compensation parameter, wherein measurement of the current physical state of the interface comprises measurement of a characteristic of the operation of the interface as a proxy measurement of the current physical state of the interface, and wherein the characteristic of the operation of the interface comprises an expected bitrate carried by the interface.

8. A method of operating a data processing system comprising:
storing at least one stored compensation parameter for application in operation of an interface, wherein the at least one stored compensation parameter represents an expected physical state of the interface;

operating the interface for communication between a first module and a second module of the data processing system;

measuring a current physical state of the interface;

generating at least one measured compensation parameter in dependence on the current physical state of the interface;

comparing the at least one measured compensation parameter with the at least one stored compensation parameter;

initiating a defensive response by the data processing system when the at least one measured compensation parameter differs by more than a threshold difference from the at least one stored compensation parameter;

wherein measuring the current physical state of the interface comprises measuring a characteristic of the operation of the interface as a proxy measurement of the current physical state of the interface, and the at least one stored compensation parameter comprises at least one trained equalisation parameter for the interface; and monitoring and updating the at least one trained equalisation parameter for the interface at intervals during operations of the interface to perform dynamic equalisation.

9. The method as claimed in claim 8, wherein operating the interface comprise at least one of:
operating the interface in one of plural states and the at least one stored compensation parameter comprises an indication of an expected operating state of the interface;

reporting an error rate measured at the interface when the interface is a memory interface and the characteristic of the operation of the interface comprises an expected error rate reported at the interface; and measuring a bitrate carried by the interface and the characteristic of the operation of the interface comprises the expected bitrate carried by the interface.

10. The method as claimed in claim 8, comprising storing plural values of the at least one stored compensation parameter, wherein the plural values of the at least one stored compensation parameter represent a sequence of measurements of the physical state of the interface in the measuring and generating steps, and wherein the comparing comprises comparing the at least one measured compensation parameter with the plural values of the at least one stored compensation parameter and determining when the at least one measured compensation parameter differs from an expected time-evolution of the physical state of the interface by more than the threshold difference.

11. The method as claimed in claim 8, comprising storing plural values of the at least one stored compensation parameter, wherein the plural values of the at least one stored compensation parameter represent plural measurements of the physical state of the interface in the measuring and generating steps, and wherein the comparing comprises comparing the at least one measured compensation parameter with the plural values of the at least one stored compensation parameter and determining when the at least one measured compensation parameter differs from an expected statistical variation in the physical state of the interface by more than the threshold difference.

12. The method as claimed in claim 8, comprising comparing the at least one measured compensation parameter with a Kalman filter generated expectation for the physical state of the interface and determining when the at least one measured compensation parameter differs from the Kalman filter generated expectation by more than the threshold difference.

* * * * *